United States Patent
Qiu et al.

(10) Patent No.: US 11,165,555 B2
(45) Date of Patent: Nov. 2, 2021

(54) LOW-COMPLEXITY SYNCHRONIZATION HEADER DETECTION

(71) Applicant: TEXAS INSTRUMENTS INCORPORATED, Dallas, TX (US)

(72) Inventors: Wenxun Qiu, Allen, TX (US); Tomas Motos, Hamar (NO); Marius Moe, Fetsund (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/028,328

(22) Filed: Sep. 22, 2020

(65) Prior Publication Data

US 2021/0006388 A1    Jan. 7, 2021

Related U.S. Application Data

(63) Continuation of application No. 16/210,420, filed on Dec. 5, 2018, now abandoned.

(51) Int. Cl.
| | |
|---|---|
| *H04L 7/04* | (2006.01) |
| *H04L 27/34* | (2006.01) |
| *H04L 27/38* | (2006.01) |
| *H04B 1/7073* | (2011.01) |

(52) U.S. Cl.
CPC ......... *H04L 7/042* (2013.01); *H04B 1/70735* (2013.01); *H04L 27/3405* (2013.01); *H04L 27/3455* (2013.01); *H04L 27/3836* (2013.01); *H04B 2201/7073* (2013.01); *H04L 2212/00* (2013.01)

(58) Field of Classification Search
CPC . H04L 7/042; H04L 27/3405; H04L 27/3455; H04L 27/3836; H04L 2212/00; H04B 1/70735; H04B 2201/7073
See application file for complete search history.

(56) References Cited

U.S. PATENT DOCUMENTS

| | | | | |
|---|---|---|---|---|
| 5,016,255 A | * | 5/1991 | Dixon | H04B 1/707 375/151 |
| 8,102,302 B2 | * | 1/2012 | Alon | G01S 13/78 342/36 |
| 2005/0157777 A1 | | 7/2005 | Mizuno | |
| 2012/0163480 A1 | | 6/2012 | Nemeth | |
| 2013/0114645 A1 | | 5/2013 | Huang | |
| 2013/0114962 A1 | | 5/2013 | Oka | |

OTHER PUBLICATIONS

IEEE Standards Association, "IEEE Standard for Local and Metropolitan Area Networks—Part 15.4: Low Rate Wireless Personal Area Networks (LR-WPANs) Amendment 3: Physical Layer (PHY) Specifications for Low-Data-Rate, Wireless, Smart Metering Utility Networks." IEEE Std 802.15.4g™—2012, Apr. 27, 2012.
Amanullah Ghazi, SDR Implementation of IEEE 802.15.4 PHY on transport triggered architecture processor, Jan. 2013, pp. 1-41.

* cited by examiner

*Primary Examiner* — Sophia Vlahos
(74) *Attorney, Agent, or Firm* — Ebby Abraham; Charles A. Brill; Frank D. Cimino

(57) ABSTRACT

A technique of separating a sequence of modulation shift keying (MSK) symbols into a first portion and a second portion and separately comparing the first portion of the sequence of MSK symbols and the second portion of the sequence of MSK symbols against a first portion of a reference sequence of MSK symbols and a second portion of the reference sequence of MSK symbols allows a low complexity detection of a start field delimiter in a wireless communication packet.

20 Claims, 4 Drawing Sheets

FIG. 3

LOW-COMPLEXITY SYNCHRONIZATION HEADER DETECTION

CROSS REFERENCE TO RELATED APPLICATION(S)

This application is a continuation of U.S. patent application Ser. No. 16/210,420, filed Dec. 5, 2018, which is incorporated herein by reference in its entirety.

TECHNICAL FIELD

This disclosure relates to the field of wireless communication, and in particular to techniques for detecting synchronization headers.

BACKGROUND

Wireless communication standards typically employ a synchronization header to allow a wireless communications receiver to recognize the beginning of a data packet. The hardware complexity required to coherently detect the synchronization header in some communications standards is significant, which may be unsuitable for small, low-cost, battery powered devices.

SUMMARY

One general aspect includes a start field delimiter detector for a wireless communications receiver, including a minimum-shift keying (MSK) demodulation circuit, configured to translate offset quadrature phase shift keying chips into MSK symbols; a first qualifier module, configured to compare a first portion of each of a plurality of sequences of MSK symbols against a first portion of each of a plurality of sequences of reference MSK symbols; a second qualifier module, configured to compare a second portion of each of the plurality of sequences of MSK symbols against a second portion of each of the plurality of sequences of reference MSK symbols, where the second portion of each of the plurality of sequences of reference MSK symbols is invariant; and a start field delimiter detector module configured to indicate detection of a start field delimiter in a wireless communications packet responsive to the first qualifier module indicating a successful match and the second qualifier module indicating a successful match.

Another general aspect includes a wireless communications receiver, including: circuitry to demodulate a received wireless signal including offset quadrature phase shift keying chips into a received plurality of sequences of MSK symbols; a microcontroller configured to detect a start field delimiter in the received plurality of MSK symbols, including a first qualifier module, configured to compare a first portion of each of the plurality of sequences of MSK symbols against a first portion of each of a plurality of sequences of reference MSK symbols. The microcontroller also includes a second qualifier module, configured to compare a second portion of each of the plurality of sequences of MSK symbols against a second portion of each of the plurality of sequences of reference MSK symbols, where the second portion of each of the plurality of sequences of reference MSK symbols is invariant. The microcontroller also includes a start field delimiter detector module configured to indicate detection of a start field delimiter in a wireless communications packet responsive to the first qualifier module indicating a successful match and the second qualifier module indicating a successful match.

Yet another general aspect includes a method of detecting a start field delimiter in a wireless communications packet, including: converting a set of offset quadrature phase shift keying chips into a plurality of sequences of MSK symbols; comparing in a first comparison a first portion of each of the plurality of sequences of MSK symbols against a first portion of a plurality of sequences of reference MSK symbols that correspond to a start field delimiter defined by a wireless communications standard; comparing in a second comparison a second portion of each of the plurality of sequences of MSK symbols against a second portion of each of the plurality of sequences of reference MSK symbols, where the second portion of each of the plurality of sequences of reference MSK symbols is invariant; and detecting the start field delimiter in the wireless communications packet responsive to the first comparison indicating a successful match and the second comparison indicating a successful match.

Yet another aspect includes a microcontroller for a wireless communications receiver, where the microcontroller is programmed to: convert a set of offset quadrature phase shift keying chips into a plurality of sequences of MSK symbols; compare in a first comparison a first portion of each of the plurality of sequences of MSK symbols against a first portion of a plurality of sequences of reference MSK symbols that correspond to a start field delimiter defined by a wireless communications standard; compare in a second comparison a second portion of each of the plurality of sequences of MSK symbols against a second portion of each of the plurality of sequences of reference MSK symbols, where the second portion of each of the plurality of sequences of reference MSK symbols is invariant; and detect a start field delimiter in a wireless communications packet responsive to the first comparison indicating a successful match and the second comparison indicating a successful match.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

FIG. 3 is a table illustrating a correspondence between SFD bits and MSK symbols according to one aspect.

DETAILED DESCRIPTION

In the following description, for purposes of explanation, numerous specific details are set forth in order to provide a thorough understanding. The principles disclosed herein may be practiced without these specific details. In other instances, structure and devices are shown in block diagram form to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one aspect" or to "an aspect" means that a particular feature, structure, or characteristic described in connection with the aspects is included in at least one aspect of the invention, and multiple references to "one aspect" or "an aspect" should not be understood as necessarily all referring to the same aspect.

Although some of the following description is written in terms that relate to software or firmware, aspects can implement the features and functionality described herein in software, firmware, or hardware as desired, including any combination of software, firmware, and hardware. References to daemons, drivers, engines, modules, or routines should not be considered as suggesting a limitation of the aspect to any type of implementation.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

The techniques described below have a lower hardware complexity than a pure offset quadrature phase shift keying (OQPSK) technique, uses lower power, and are thus suited for low-cost, battery operated devices. The techniques may produce an acceptable performance level compared to the coherent start-of-frame delimiter (SFD) detection technique, with approximately 3 dB of penalty. For example, an Atmel AT86RF215 IEEE 802.15.4g transceiver implements a coherent OQPSK SFD detection technique with a 28 mA current, while the techniques described below can be implemented in an example Texas Instruments (TI) CC1312 receiver with a 6 mA current.

Figure 1:
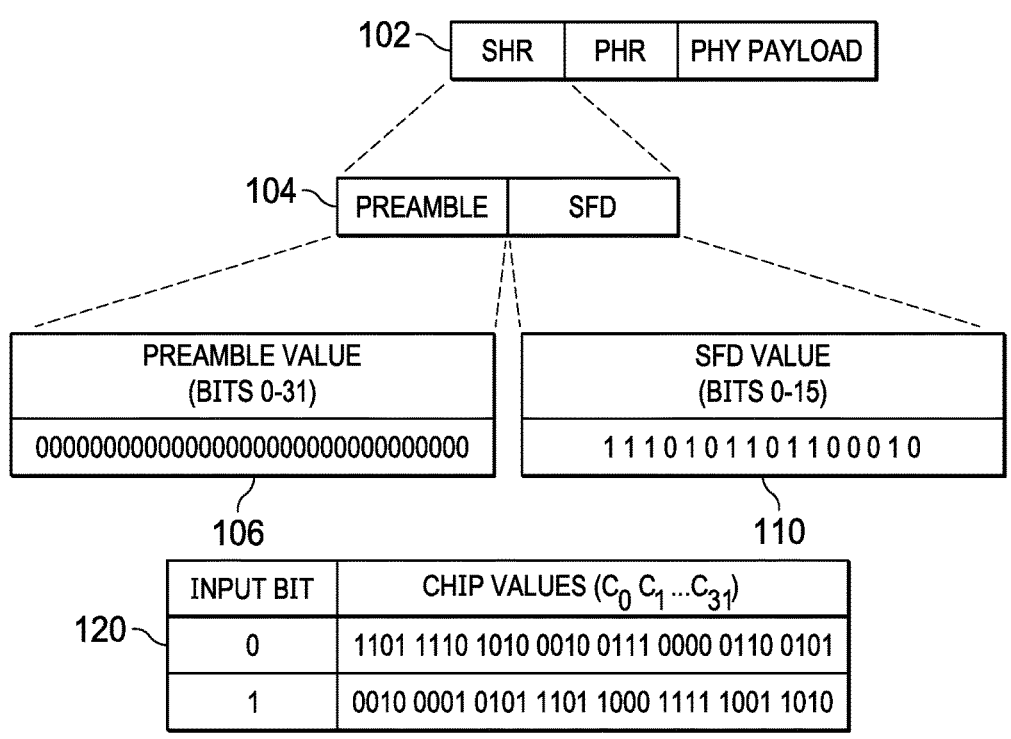
FIG. 1 is a block diagram illustrating spreading of a start of frame delimiter (SFD) from 16 bits to 512 chips according to one aspect.

An example of a wireless communication standard is the Institute of Electrical and Electronics Engineers (IEEE) 802.15.4g, also known as the Smart Utility Network (SUN) standard, which uses an OQPSK digital modulation scheme that conveys data by changing the phase of a reference signal. The IEEE 801.15.4g SUN OQPSK specification defines a packet format 102 consisting of a synchronization header (SHR), a packet header (PHR), and a PHY Payload. The SHR 104 in the 802.15.4g standard is then defined as including a preamble 106 and a start of frame delimiter (SFD) 110 as illustrated in FIG. 1. The preamble 106 is a sequence of 32 bit zeros, while the SFD is a sequence of 16 bits as illustrated in FIG. 1. Each bit of the preamble 106 and each bit of the SFD 110 is spread to 32 chips in the OQPSK signal, using the table 120 of FIG. 1, thus the preamble 106 is spread to 1024 chips and the SFD 110 is spread to 512 chips. The receiver must then be able to recognize or detect the preamble 106 and the SFD 110 before the receiver can process the data payload.

Figure 2:
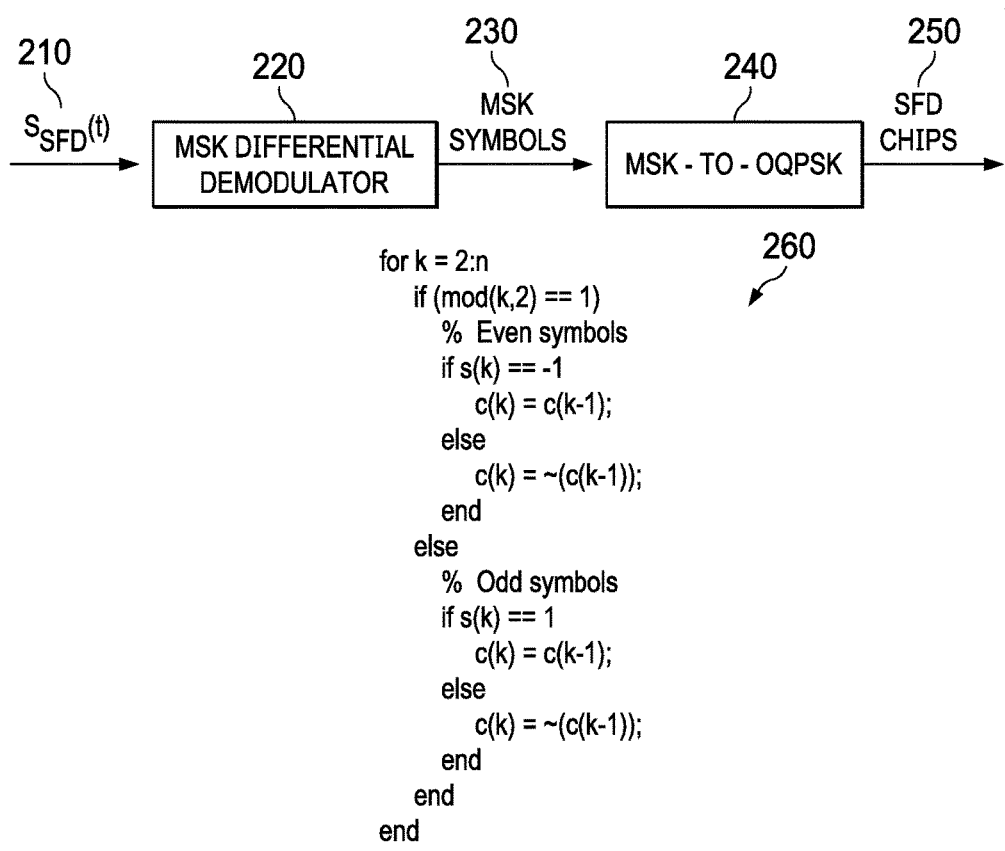
FIG. 2 is a block diagram illustrating a technique for processing an SFD using an MSK to offset quadrature phase shift keying (OQPSK) translator according to one aspect.

The 802.15.4g SUN OQPSK modulation can be alternatively described as a minimum-shift keying (MSK) modulation. An OQPSK receiver can be implemented as an MSK demodulator followed by an MSK symbol to OQPSK chip translation block, such as is illustrated in the example of FIG. 2. The wireless signal $S_{SFD}(t)$ 210 can be processed by an MSK demodulator 220, such as an MSK differential demodulator, to generate MSK symbols 230. Those MSK symbols 230 can then be translated into OQPSK chips 250 by translation module 240. The MSK symbols 230 can further be examined in the receiver for an equivalent MSK symbol sequence that corresponds to the SFD 110, using a specific detection algorithm. Code example 260 illustrates one technique for performing an OQPSK to MSK translation, producing for an SFD 110 the MSK symbols of FIG. 3. A similar technique (not shown) allows translating MSK symbols into OQPSK chips.

Figure 3:
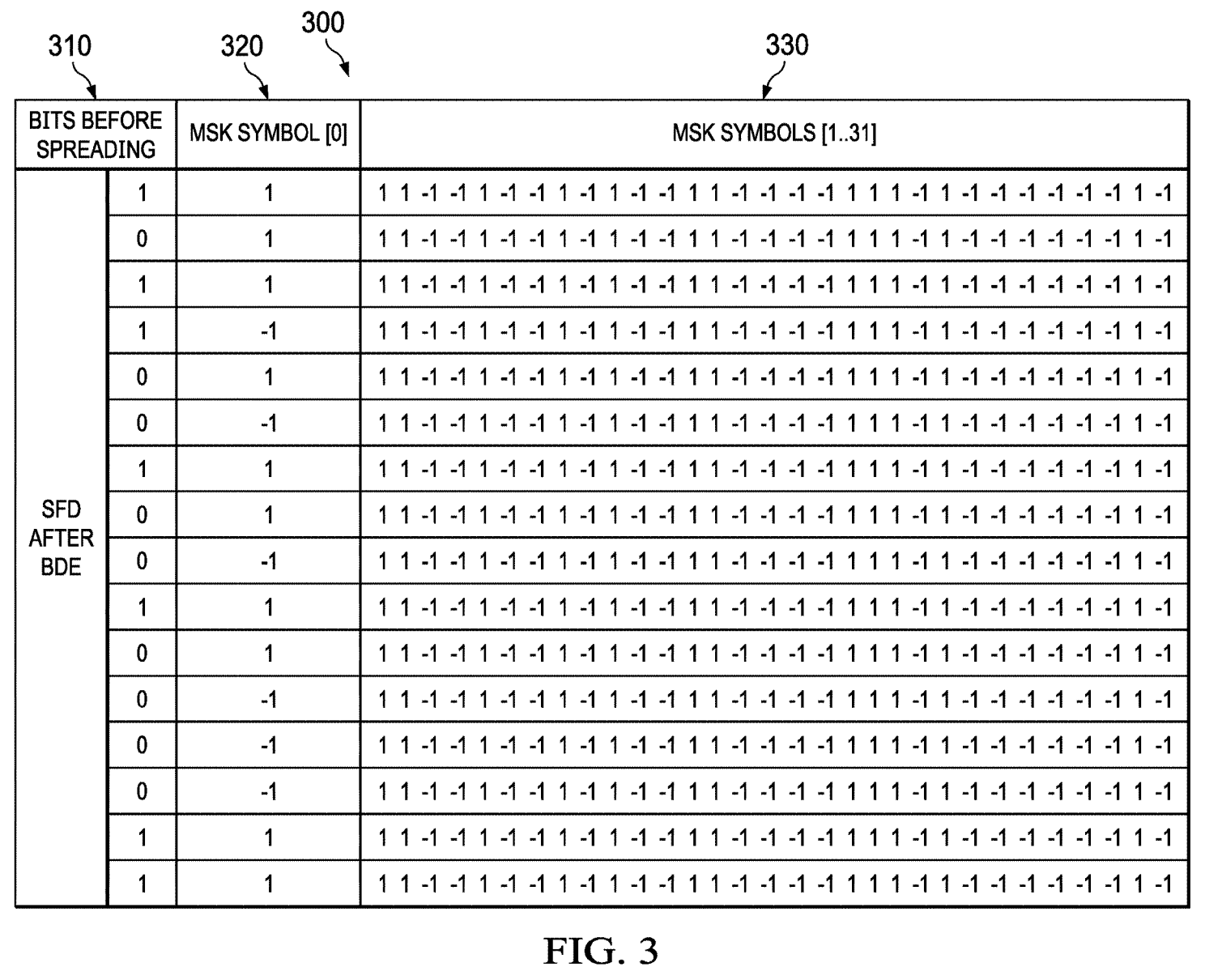

FIG. 3 is a table that illustrates the 512 reference MSK symbols that correspond to the SFD 110. The table 300 illustrates how the bits of SFD 110, before spreading into chips, translate into MSK symbols from an OQPSK signal. Column 310 sets forth each of the 16 SFD bits. The MSK translators described above convert the OQPSK signal into 16 sequences of 32 MSK symbols, with each sequence of 32 MSK symbols corresponding to a bit of the SFD 110. MSK symbol [0] is illustrated in column 320, and MSK symbols [1 . . . 31] are illustrated in column 330. As can be easily seen in column 330, MSK symbols [1 . . . 31] are invariant for every sequence of MSK symbols that correspond to the SFD bits.

The Hamming distance between the 32-chip sequence corresponding to each bit of the SFD 110 in the OQPSK domain is 32. As illustrated in FIG. 3, the Hamming distance in the MSK domain between any pair of the 32 MSK symbols corresponding to any bit of the SFD is 1, because the only variable portion of the sequences of 32 MSK symbols is the first MSK symbol. The result of such a low Hamming distance is that the performance of a pure MSK to OQPSK translator such as described in FIG. 2 is poor. Most of the information in each row of the table is discarded and a pure MSK to OQPSK translator is more sensitive to noise or other errors introduced into the signal that would be desirable. The techniques described below, however, take advantage of the invariance of the MSK symbols [1 . . . 31] to allow consideration of the MSK symbols using a low-complexity determination that the received OQPSK signal is an SFD 110, but which retains the ability to overcome errors that the simple MSK to OQPSK translator of FIG. 2 handles poorly.

Figure 4:
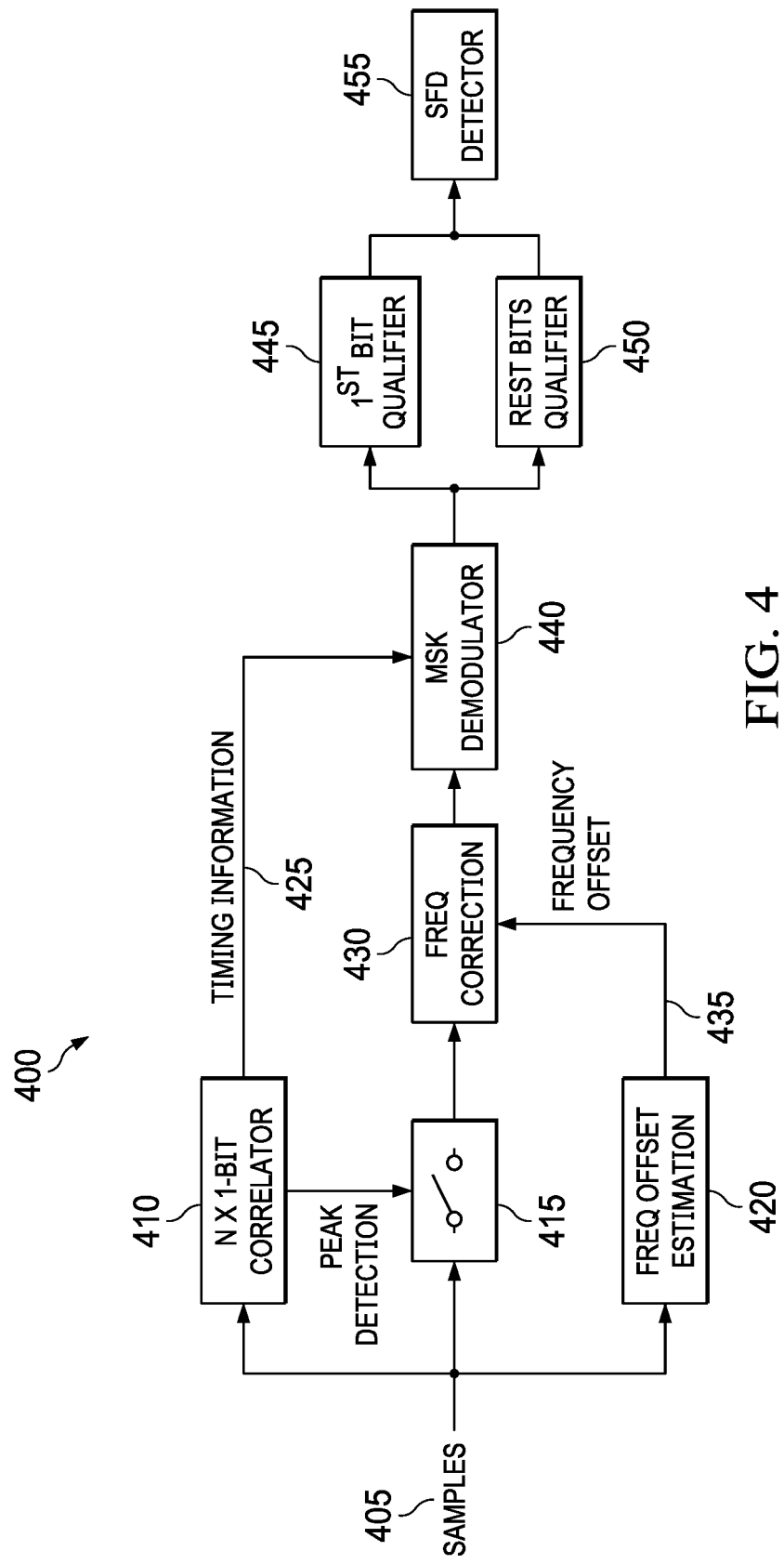
FIG. 4 is a block diagram illustrating a portion of an SFD detector device according to one aspect.

FIG. 4 is a block diagram of an SFD 110 detector portion of a wireless communications receiver that takes advantage of the fact that MSK symbols [1 . . . 31] are invariant in an SFD 110. The technique qualifies separately the first symbol (MSK symbol [0]) and the rest of the MSK symbols (MSK [1 . . . 31]). An SFD 110 is detected using this technique when then the first symbol (MSK symbol [0]) matches the expected MSK sequence for an SFD 110 as illustrated in FIG. 3 and the rest of the symbols (MSK symbols [1 . . . 31]) also match the expected MSK symbol sequence illustrated in FIG. 3. Because this technique uses more of the information in the MSK symbol sequence, various aspects of a detector may allow small variances between the expected sequences of MSK symbols [0] to occur and still be a successful match that indicate detection of an SFD 110. In one aspect, a counter may count the number of MSK symbols [0] that match (or do not match) the expected value of the MSK symbols [0]. If the count of MSK symbols [0] that do not match is less than a threshold value of discrepancies, the detector may consider the sequence of MSK symbols [0] to indicate an SFD 110, as long as the MSK symbols [1 . . . 31] exactly match the expected values. So, for example, with a threshold of 3, a sequence in which 1 or 2 of the MSK symbols [0] differ from the expected values may still be recognized as detection of an SFD 110 sequence, as long as there is strict identity of the MSK symbols [1 . . . 31]. This allows the detector to be less sensitive to noise than a pure MSK technique as described in FIG. 2, making use of the information in all the MSK symbol sequences, instead of throwing the MSK symbols [1 . . . 31] away.

Other aspects may relax the strict identity requirement of MSK symbols [1 . . . 31]. In one aspect, a Hamming distance threshold value may be used to determine whether the sequence of MSK symbols [1 . . . 31] should be considered as matching the expected sequence of MSK symbols [1 . . . 31]. For example, a variance in the Hamming distance that is less than the threshold value may be considered a match, while a variance at or above the threshold may be considered not to match, thus indicating not detecting an SFD 110.

Turning now to FIG. 4, a block diagram illustrates an SHR detector 400 portion of a wireless communications receiver that performs the detection of the preamble 106 and the SFD 110 according to one aspect. Other portions of the wireless communications receiver, such as the portion that converts the data payload portion of the input signal are omitted for clarity. In this example aspect, the input signal 405 is sampled by an N×1-bit correlation circuit 410, a peak detection circuit 415, and a frequency offset estimation circuit 420. The output of the peak detection circuit 415 and the frequency offset output 435 of the frequency offset estimation circuit 420 are used as input to a frequency correction circuit 430. These circuits are well known in the wireless communications receiver industry and need no further discussion here.

The timing information 425 produced by the N×1-bit correlation circuit 410 (where N=512) and the frequency corrected signal output by the frequency correction circuit 430 are used to detect the preamble 106, which then indicates the beginning of the SFD 110. The signal containing the SFD 110 is input into the MSK demodulator circuit 440, which processes the frequency corrected input signal output from frequency correction circuit 430 using the timing information 425 to produce a sequence of MSK symbols.

The MSK symbols output from the MSK demodulator circuit 440 are then processed by qualifier module 445 to qualify the $1^{st}$ MSK symbol for each of the 32 symbols that may correspond to a potential SFD 110 as well as by qualifier module 450 to qualify the $2^{nd}$-$31^{4}$ symbols (corresponding to MSK symbols [1 . . . 31] of column 330). If both the $1^{st}$ MSK symbol and the $2^{nd}$-$31^{4}$ MSK symbols qualify by matching the sequences of reference MSK symbols illustrated in FIG. 3, the SFD detector circuit 455 indicates that the SFD 110 has been identified in the signals received by the wireless communications receiver, allowing the receiver to then process the data payload portion of the signals by performing the MSK to OQPSK translation on the signal following the SFD 110. As indicated above, the SFD 110 detection is performed after detection of a preamble signal portion defined by the wireless communication standard, and all of the procedure is performed for every packet received by the wireless communications receiver. The preamble is a repetitive pattern defined by the wireless communication standard and does not contain any information specific to the data contained in the packet.

In various aspects, the any or all of the elements 410, 415, 420, 430, 440, 445, 450, and 455 illustrated in FIG. 4 may be implemented in hardware, firmware, software, or any combination of the hardware, firmware, or software. For example, the elements 445, 450, and 455 may be implemented using a microcontroller or processor chip such as a TI CC1312 microcontroller that is programmed to perform the procedure described herein.

Figure 5:
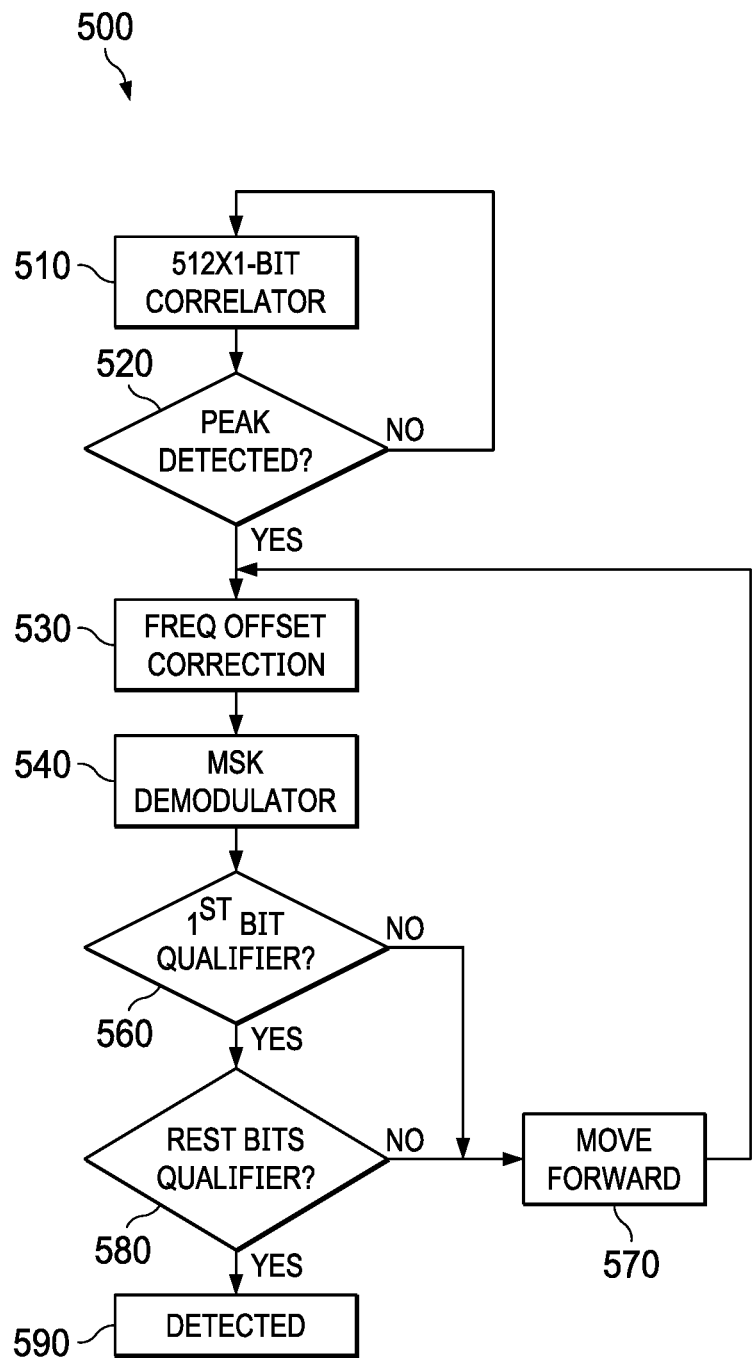
FIG. 5 is a flowchart illustrating a technique for detecting an SFD according to one aspect.

Turning now to FIG. 5, a flowchart illustrates a procedure 500. The 512×1-chip correlation circuit 510, corresponding to the N×1-bit correlation circuit 410 of FIG. 4, attempts to identify the preamble 106 using Hamming distance calculations compared to a reference 512-chip sequence of a preamble 106. When the Hamming distance calculation indicates that the 512-chip sequence is within a threshold distance of the reference sequence, a peak is indicated by the peak detector block 520, allowing frequency offset correction to be performed in block 530, corresponding to the frequency offset estimation circuit 420 and frequency correction circuit 430 of FIG. 4. Once the frequency offset correction of block 530 has been performed, MSK demodulation is performed in block 540, corresponding to the MSK demodulation circuit 440 of FIG. 4, producing a sequence of 512 MSK symbols, 16 groups of MSK symbols [0 . . . 31]. In block 560, the first MSK symbol (MSK symbol [0]) of each of the 16 groups is compared with the expected sequence of first MSK symbols illustrated in column 320 of FIG. 3, based on Hamming distance calculations. If no match is found, then the detector procedure moves forward in block 570 to examine another signal portion starting with frequency offset correction in block 530. If a match is found, then in block 580 the rest of the MSK symbols (MSK symbols [1 . . . 31]) are compared to see if they match the sequence in column 330 of FIG. 3, again based on Hamming distance calculations. If no match is found, such as the Hamming distance calculations are outside of a predetermined threshold Hamming distance, then the procedure proceeds to block 570 to move forward as described above. Although illustrated in FIG. 5 as occurring sequentially, various aspects may implement the comparisons of block 560 and 580 in parallel or in reverse of the order illustrated in FIG. 5. If both the first MSK symbols in each group of 32 MSK symbols match the expected sequence in column 320 of FIG. 3 and the rest of the MSK symbols match the set of 31 MSK symbols shown in col. 330 of FIG. 3, then the SFD detector procedure 500 indicates an SFD 110 has been detected in block 590 and the wireless communications receiver may begin processing the data portion of the wireless packet.

Aspects may be implemented in one or a combination of hardware, firmware, and software. Aspects may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Aspects, as described herein, may include, or may operate on, logic or a number of components, modules, or mechanisms. Modules may be hardware, software, or firmware communicatively coupled to one or more processing elements to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a standalone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

While certain exemplary aspects have been described in detail and shown in the accompanying drawings, it is to be understood that such aspects are merely illustrative of and not devised without departing from the basic scope thereof, which is determined by the claims that follow.

We claim:

1. A start field delimiter detector for a wireless communications receiver, comprising:
a minimum-shift keying (MSK) demodulation circuit, configured to translate offset quadrature phase shift keying chips into a plurality of sequences of MSK symbols;
a first qualifier circuit, configured to compare whether a first portion of each of the plurality of sequences of MSK symbols matches with a first portion of each of a plurality of sequences of reference MSK symbols;
a second qualifier circuit, configured to compare whether a second portion of each of the plurality of sequences of MSK symbols matches with a second portion of each of the plurality of sequences of reference MSK symbols, wherein the second portion of each of the plurality of sequences of reference MSK symbols is invariant; and
a start field delimiter detector circuit configured to indicate detection of a start field delimiter in a wireless communications packet responsive to the first qualifier circuit indicating a first successful match when the first portion of each of the plurality of sequences of MSK symbols matches with the first portion of each of the plurality of sequences of reference MSK symbols and the second qualifier circuit indicating a second successful match when the second portion of each of the plurality of sequences of MSK symbols matches with the second portion of each of the plurality of sequences of reference MSK symbols.

2. The start field delimiter detector of claim 1,
wherein each sequence of the plurality of sequences of MSK symbols is a sequence of 32 MSK symbols, and wherein the first portion of each sequence of the plurality of sequences of MSK symbols is a first MSK symbol of the sequence of 32 MSK symbols.

3. The start field delimiter detector of claim 1,
wherein each sequence of the plurality of sequences of MSK symbols is a sequence of 32 MSK symbols, and
wherein the second portion of each sequence of the plurality of sequences of MSK symbols is a second through 31st MSK symbols of the sequence of 32 MSK symbols.

4. The start field delimiter detector of claim 1,
wherein the start field delimiter is an IEEE 802.15.4g start field delimiter.

5. The start field delimiter detector of claim 1,
wherein the first qualifier circuit is configured to compute a Hamming distance between the first portion of each of the plurality of sequences of MSK symbols and the first portion of each of the plurality of sequences of reference MSK symbols, and
wherein the first qualifier circuit is configured to determine the first successful match responsive to the Hamming distance having a first relationship with a first threshold value.

6. The start field delimiter detector of claim 1,
wherein the second qualifier circuit is configured to compute a Hamming distance between the second portion of each of the plurality of sequences of MSK symbols and the second portion of each of the plurality of sequences of references MSK symbols, and
wherein the second qualifier circuit is configured to determine the second successful match responsive to the Hamming distance having a second relationship with a second threshold value.

7. A wireless communications receiver, comprising:
circuitry to demodulate a received wireless signal comprising offset quadrature phase shift keying chips into a received plurality of sequences of minimum-shift keying (MSK) symbols; and
a microcontroller configured to detect a start field delimiter in the received plurality of sequences of MSK symbols, comprising:
a first qualifier circuit, configured to compare whether a first portion of each of the plurality of sequences of MSK symbols matches with against a first portion of each of a plurality of sequences of reference MSK symbols;
a second qualifier circuit, configured to compare whether a second portion of each of the plurality of sequences of MSK symbols matches with a second portion of each of the plurality of sequences of reference MSK symbols, wherein the second portion of each of the plurality of sequences of reference MSK symbols is invariant; and
a start field delimiter detector circuit configured to indicate detection of a start field delimiter in a wireless communications packet responsive to the first qualifier circuit indicating a first successful match when the first portion of each of the plurality of sequences of MSK symbols matches with the first portion of each of the plurality of sequences of reference MSK symbols and the second qualifier circuit indicating a second successful match when the second portion of each of the plurality of sequences of MSK symbols matches with the second portion of each of the plurality of sequences of reference MSK symbols.

8. The wireless communications receiver of claim 7,
wherein each sequence of the plurality of sequences of MSK symbols is a sequence of 32 MSK symbols, and
wherein the first portion of each sequence of the plurality of sequences of MSK symbols is a first MSK symbol of the sequence of 32 MSK symbols.

9. The wireless communications receiver of claim 7,
wherein each sequence of the plurality of sequences of MSK symbols is a sequence of 32 MSK symbols, and
wherein the second portion of each sequence of the plurality of sequences of MSK symbols is a second through 31st MSK symbols of the sequence of 32 MSK symbols.

10. The wireless communications receiver of claim 7, wherein the start field delimiter is an IEEE 802.15.4g start field delimiter.

11. The wireless communications receiver of claim 7,
wherein the first qualifier circuit is configured to compute a Hamming distance between the first portion of each of the plurality of sequences of MSK symbols and the first portion of each of the plurality of sequences of reference MSK symbols, and
wherein the first qualifier circuit is configured to determine the first successful match responsive to the Hamming distance having a first relationship with a first threshold value.

12. The wireless communications receiver of claim 7,
wherein the second qualifier circuit is further configured to compute a Hamming distance between the second portion of each of the plurality of sequences of MSK symbols and the second portion of each of the plurality of sequences of references MSK symbols, and
wherein the second qualifier circuit is further configured to determine the second successful match responsive to the Hamming distance having a first relationship with a second threshold value.

13. A method of detecting a start field delimiter in a wireless communications packet, comprising:
converting a set of offset quadrature phase shift keying chips into a plurality of sequences of minimum-shift keying (MSK) symbols;
comparing in a first comparison whether a first portion of each of the plurality of sequences of MSK symbols matches with a first portion of a plurality of sequences of reference MSK symbols that correspond to a start field delimiter defined by a wireless communications standard;
comparing in a second comparison whether a second portion of each of the plurality of sequences of MSK symbols matches with a second portion of each of the plurality of sequences of reference MSK symbols, wherein the second portion of each of the plurality of sequences of reference MSK symbols is invariant; and
detecting the start field delimiter in the wireless communications packet responsive to the first comparison indicating a first successful match when the first portion of each of the plurality of sequences of MSK symbols matches with the first portion of each of the plurality of sequences of reference MSK symbols and the second comparison indicating a second successful match when the second portion of each of the plurality of sequences of MSK symbols matches with the second portion of each of the plurality of sequences of reference MSK symbols.

14. The method of claim 13,
wherein each sequence of the plurality of sequences of MSK symbols is a sequence of 32 MSK symbols,
wherein the first portion of each sequence of the plurality of sequences of MSK symbols is a first MSK symbol of the sequence of 32 MSK symbols, and
wherein the second portion of each sequence of the plurality of sequences of MSK symbols is a second through 31st MSK symbols of the sequence of 32 MSK symbols.

15. The method of claim 13,
wherein the start field delimiter is an IEEE 802.15.4g start field delimiter.

16. The method of claim 13,
wherein comparing in the first comparison comprises computing a Hamming distance between the first portion of each of the plurality of sequences of MSK symbols and the first portion of each of the plurality of sequences of reference MSK symbols, and
wherein the first comparison indicates the first successful match responsive to the Hamming distance having a first relationship with a first threshold value.

17. The method of claim 13,
wherein comparing in the second comparison comprises computing a Hamming distance between the second portion of each of the plurality of sequences of MSK symbols and the second portion of each of the plurality of sequences of references MSK symbols, and
wherein the second comparison indicates the second successful match responsive to the Hamming distance having a first relationship with a second threshold value.

18. An apparatus, comprising:
a microcontroller, programmed to:
convert a set of offset quadrature phase shift keying chips into a plurality of sequences of minimum-shift keying (MSK) symbols;
compare in a first comparison whether a first portion of each of the plurality of sequences of MSK symbols matches with a first portion of a plurality of sequences of reference MSK symbols that correspond to a start field delimiter defined by a wireless communications standard;
compare in a second comparison whether a second portion of each of the plurality of sequences of MSK symbols matches with a second portion of each of the plurality of sequences of reference MSK symbols, wherein the second portion of each of the plurality of sequences of reference MSK symbols is invariant; and
detect a start field delimiter in a wireless communications packet responsive to the first comparison indicating a successful match when the first portion of each of the plurality of sequences of MSK symbols matches with the first portion of each of the plurality of sequences of reference MSK symbols and the second comparison indicating a successful match when the second portion of each of the plurality of sequences of MSK symbols matches with the second portion of each of the plurality of sequences of reference MSK symbols.

19. The apparatus of claim 18,
wherein the start field delimiter is an IEEE 802.15.4g start field delimiter,
wherein each sequence of the plurality of sequences of MSK symbols is a sequence of 32 MSK symbols,
wherein the first portion of each sequence of the plurality of sequences of MSK symbols is a first MSK symbol of the sequence of 32 MSK symbols, and wherein the second portion of each sequence of the plurality of sequences of MSK symbols is a second through 31st MSK symbols of the sequence of 32 MSK symbols.

20. The apparatus of claim 18,
wherein the microcontroller is programmed to compare in the first comparison by being programmed to:
compute a first Hamming distance between the first portion of each of the plurality of sequences of MSK symbols and the first portion of each of the plurality of sequences of reference MSK symbols, and
wherein the microcontroller is programmed to compare in the second comparison by being programmed to:
compute a second Hamming distance between the second portion of each of the plurality of sequences of MSK symbols and the second portion of each of the plurality of sequences of references MSK symbols.

* * * * *